3,423,352
METHOD OF PREPARATION OF VINYL
ACETATE COPOLYMER LATEX
Eli Levine, Hillside, and John R. Costanza, North Plainfield, N.J., assignors to Celanese Corporation, New York, N.Y., a corporation of Delaware
No Drawing. Continuation-in-part of application Ser. No. 461,529, June 4, 1965. This application May 10, 1966, Ser. No. 548,850
U.S. Cl. 260—29.6        13 Claims
Int. Cl. C09d 5/02; C08f 44/24, 15/00

ABSTRACT OF THE DISCLOSURE

A method of preparing new and useful, stable aqueous emulsion of a vinyl acetate copolymer having solids contents in excess of 60% and viscosities in the range from about 1000 to about 2500 centipoises by controlling the monomer, catalyst and surfactant addition.

---

This application is a continuation-in-part of our copending U.S. patent application Ser. No. 461,529, filed June 4, 1965, and now abandoned.

This invention relates to novel methods of preparing aqueous polymer emulsions, as well as to the thus-prepared emulsions themselves.

More particularly, this invention relates to a novel method of preparing useful, stable aqueous vinyl acetate copolymer emulsions having higher solids contents than had hitherto been obtainable using conventional emulsion polymerization techniques, while at the same time having reduced viscosities and improved freeze-thaw stability.

It goes almost without saying that aqueous emulsions of vinyl acetate polymers, as well as various methods for their preparation, have been known for many years. The procedures used to prepare such polymer emulsions generally involve first admixing, under rapid stirring monomeric vinyl acetate, together with one or more vinyl comonomers, with water, surfactants or emulsifying agents, a polymerization catalyst or initiator, and, in most cases, a protective colloid-forming substance. This mixture is then heated to polymerization temperature, with continued stirring, for the time necessary to substantially completely form the polymer emulsion. The resulting emulsion, upon cooling and filtering, can be used for many purposes, among which are surface coatings, e.g., paints, paper coatings, textile treating agents and adhesive applications.

One difficulty which has long been associated with polyvinyl acetate emulsions is their lack of freeze-thaw stability. This has limited the use of such emulsions in many areas, since to be completely acceptable for all applications a polymer emulsion must be stable over a wide range of temperatures.

Another and perhaps more serious problem encountered in polyvinyl acetate emulsions produced by techniques currently being practiced is that it is rarely if ever possible to prepare such emulsions having solids contents in excess of about 55% which are neither too viscous for convenient handling nor of such limited shelf stability as to render impossible their use in paints or other coatings. Obviously, it would be advantageous to be able to increase the amount of vinyl acetate polymer in these conventional emulsions, thereby providing emulsions having solids contents as high as about 70% or more. Such high solids emulsions would be more economical to ship and store, due to their decreased water content, and would also provide thicker coatings of polymer per pass in any coating or film-forming operation.

The present invention provides a solution to each of the aforementioned difficulties. More particularly, it has now been discovered, quite unexpectedly, that by adding relatively large amounts of both surfactant and water soluble polymerization catalyst or initiator to a conventionally prepared aqueous polyvinyl acetate emulsion having a solids content of up to about 52% and containing relatively large amounts of vinyl acetate, at specified times once the polymerization reaction has proceeded to a certain extent, as will be described in greater detail hereinbelow, the viscosity of the emulsion is markedly reduced. This not only gives useful, stable polyvinyl acetate emulsions having improved freeze-thaw stability, but also permits the incorporation of more monomer or monomers into the initially-prepared emulsion, followed by a further polymerization period, which in turn gives useful stable emulsions having higher solids contents than are found in known polyvinyl acetate emulsions.

It is, therefore, an object of the present invention to provide novel methods of preparing aqueous copolymer emulsions.

A further object of the present invention is to provide commercially useful, aqueous polyvinyl acetate emulsions having higher solids contents than had hitherto been obtainable using known methods.

It is also an object of the present invention to provide aqueous polyvinyl acetate emulsions having reduced viscosities and improved freeze-thaw stability.

These and other objects of the present invention, as well as the means of effectuating them, will be discussed in greater detail hereinbelow.

The chemical or physical nature of the changes in the initially-prepared emulsion occasioned by the addition of surfactant and catalyst in the manner taught by the present invention is not clearly understood. However, without wishing to be bound by any particular theory or explanation or to be limited to any particular mechanism, applicants believe that these added components provide a balanced environment having physical characteristics essential to the preparation of the high solids vinyl acetate copolymer emulsions with which the present invention is particularly concerned, i.e., those having a solids content in excess of 60% up to about 70%, and generally in excess of 60% to about 65%, and wherein said copolymers contain more than about 75% by weight, and preferably at least about 80% by weight, based on the total weight of monomers present, of vinyl acetate alone or together with monomers other than vinyl acetate whose water solubility is equal to or greater than that of vinyl acetate (i.e., a solubility equal to or greater than 2.5 grams per 100 grams of water at 25° C.). Of course, the copolymer will also contain some monomer or monomers whose water solubility is less than that of vinyl acetate. Ordinarily, from about 5% to about 20% by weight, on the above-stated basis, of such monomers will be used, and thus the maximum amount of vinyl acetate or monomers other than vinyl acetate whose water solubility is equal to or greater than that of vinyl acetate which will be used will generally not exceed about 95% by weight, on the above-stated basis.

On the one hand, the addition of surfactant to an emulsion polymerization reaction already in progress in the manner taught by the present invention (which, for the sake of simplicity, will be referred to as the intermediate addition of surfactant) is thought to have several beneficial results, each of which aids in overcoming dilatancy in the emulsion, which can lead to poor leveling, flow and wetting properties, as well as limited shelf stability.

First of all, as the emulsion polymerization proceeds the quantities of surfactant which initially formed the micelles in whose essentially hydrocarbon interiors polymerization takes place (and into which activated monomer migrates from the surrounding aqueous phase to polymerize with monomer already in the micelles) now go instead to stabilize the polymer which is formed. Consequently, the newly added surfactant provides for the formation of new micelles, thus giving loci for fresh polymerization.

The newly added surfactant also serves to stabilize the emulsion against any deleterious effects resulting from the addition of the remainder of the required monomer or monomers.

Finally, this added surfactant serves to replace the initially employed surfactant which has been degraded by the initially employed polymerization catalyst.

On the other hand, applicants also believe that the extra added catalyst (which, again for the sake of simplicity, will be referred to as the post-added catalyst) attacks the surfactant and, when used, an ether linkage-containing protective colloid, reducing their molecular weights by an oxidative mechanism which involves rupture of ether linkages. This oxidative degradation ultimately reduces the effectiveness of the surfactant and the ether linkage-containing protective colloid, thus permitting a modest degree of particle agglomeration to occur, and it is further believed that it is this increase in the average particle size of the emulsion which accounts for the reduction in viscosity.

Of course this post-added catalyst, whether introduced prior to or with the remainder of the total amount of monomer or monomers to be introduced into the emulsion polymerization system, also serves to initiate the polymerization of said monomer, thereby increasing the solids content of the emulsion. In contrast, however, to known procedures for the preparation of polyvinyl acetate emulsions by the stepwise addition of both monomer and polymerization initiator during a polymerization reaction, the novel method of the present invention involves the post-addition of relatively large amounts of initiator to what are essentially fully formed polymers.

It should also be noted here that this reduction in viscosity, while providing the aforementioned beneficial results, does not adversely affect, to any noticeable extent, the useful properties of the emulsion.

The emulsions prepared by the novel method of the present invention contain copolymers of vinyl acetate with one or more different, ethylenically unsaturated comonomers, preferably ones containing a $H_2C=C<$ group. Generally, when preparing these copolymers, from about 5% to about 50% by weight, and preferably from about 10% to about 30% by weight, based on the total weight of monomers present, of monomers other than vinyl acetate will be used, with the proviso, as indicated above, that the total amount of vinyl acetate plus monomers other than vinyl acetate whose water solubility is equal to or greater than that of vinyl acetate will be, in all cases, greater than about 75% by weight, based on the total weight of monomers present.

Included among such comonomers are monoethylenically unsaturated aliphatic hydrocarbons such as ethylene, propylene and isobutylene, and monoethylenically unsaturated substituted aliphatic hydrocarbons such as vinyl fluoride, vinyl chloride, vinyl bromide, vinylidene fluoride, 1-chloro-1-fluoroethylene, chlorotrifluoroethylene and tetrafluoroethylene.

In addition, one can also use unsaturated acids such as acrylic acid, methacrylic acid, crotonic acid and itaconic acid, as well as polymerizable derivatives thereof, e.g., alkyl acrylates and methacrylates such as methyl acrylate, ethyl acrylate, n-propyl acrylate, n-butyl acrylate, isobutyl acrylate, 2-ethylhexyl acrylate, methyl methacrylate, ethyl methacrylate, n-propyl-methacrylate and isobutyl methacrylate, acrylonitrile, methacrylonitrile, acrylamide, methacrylamide, N-methylolacrylamide, alkylated N-methylolacrylamides such as N-methoxymethylacrylamide and N-butoxymethylacrylamide, and acrolein.

Further, other derivatives of the hypothetical vinyl alcohol, e.g., aliphatic vinyl esters such as vinyl formate, vinyl propionate and vinyl butyrate, aliphatic vinyl ethers such as methyl vinyl ether, ethyl vinyl ether and n-butyl vinyl ether, and vinyl ketones such as methyl vinyl ketone, ethyl vinyl ketone and isobutyl vinyl ketone, can also be employed, as can allyl esters of saturated (which includes polymerizably non-reactive unsaturation) monocarboxylic acids, e.g., allyl acetate, allyl propionate and allyl lactate, and alkyl esters of monoethylenically unsaturated dicarboxylic acids, e.g., diethyl maleate, dibutyl maleate, dioctyl maleate, dipropyl fumarate, dibutyl fumarate, dioctyl fumarate, didecyl fumarate, dibutyl itaconate and dioctyl itaconate.

Since the conditions under which the emulsion polymerization reaction itself is carried out are those conventionally used in the art, the surfactants or emulsifying agents employed can be any of the anionic, cationic or non-ionic materials usually employed for this purpose, as well as mixtures thereof, provided that a predominant amount, i.e., from about 50% to about 100% by weight, based on the total surfactant content, and preferably all of the surfactant present contains at least four, and preferably more than four, ether linkages.

A particularly preferred class of polyether surfactants or emulsifying agents encompasses ethylene oxide and propylene oxide condensates in general, including straight and branched-chain alkyl and alkylaryl polyethylene glycol and polypropylene glycol ethers and thioethers, and more particularly substances such as the "Igepals," which are members of a homologous series of alkylphenoxypoly (ethyleneoxy) ethanols, which series can be represented by the general formula

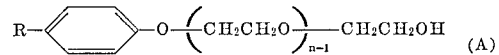
(A)

wherein R represents an alkyl radical and $n$ represents the number of mols of ethylene oxide employed, among which are alkylphenoxypoly(ethyleneoxy) ethanols having alkyl groups containing from about 7 to about 18 carbon atoms, inclusive, and having from about 4 to about 100 ethyleneoxy units, such as the heptylphenoxypoly(ethylenoxy) ethanols, nonylphenoxypoly(ethyleneoxy) ethanols and dodecylphenoxypoly(ethyleneoxy) ethanols; the sodium or ammonium salts of the sulfate esters of these alkylphenoxypoly(ethyleneoxy) ethanols; alkylpoly(ethyleneoxy) ethanols; alkylpoly (propyleneoxy) ethanols; octylphenoxyethoxyethyldimethylbenzylammonium chloride; polyethylene glycol t-dodecylthioether; the "Tweens," which are polyoxyalkylene derivatives of hexitol (including sorbitans, sorbides, mannitans and mannides) anhydride partial long-chain fatty acid esters, such as the polyoxyalkylene derivatives of sorbitan monolaurate, sorbitan monopalmitate, sorbitan monostearate, sorbitan tristearate, sorbitan monoöleate and sorbitan trioleate, the "Pluronics," which are condensates of ethylene oxide with a hydrophobic base formed by condensing propylene oxide with propylene glycol, and the like.

The total amount of surfactant employed in practicing the novel process of the present invention, i.e., initially-employed surfactant plus intermediate surfactant, will generally range from about 3% to about 10% by weight, and preferably from about 5% to about 7.5% by weight, based on the total weight of monomers present.

As previously indicated, a protective colloid-forming substance is generally employed, and will usually contain at least one ether linkage, and preferably a plurality thereof. Included among such ether-linkage containing materials are hydroxymethyl cellulose, hydroxyethyl cellulose, ethyl hydroxyethyl cellulose, ethoxylated starch derivatives, and the like. However, other protective colloid-forming substances, i.e., ones containing no ether linkages, can also be used either alone or together with said ether linkage-containing materials, and included among these are partially and fully hydrolyzed polyvinyl alcohols, natural and synthetic gums, such as gum tragacanth and gum arabic, polyacrylic acid, poly (methyl vinyl ether/ maleic anhydride), and the like. All of those materials will be used in the amounts found in conventional emulsion polymerization procedures (generally from about 0.1% to about 2% by weight, based on the total weight of the emulsion).

Similarly, the catalysts used in polymerizing the emulsified monomer or monomer mixture are those conventionally employed in emulsion polymerization reactions.

Thus, a catalytic amount of a free radical polymerization catalyst or catalyst system (which can also be referred to as an addition polymerization catalyst, a vinyl polymerization catalyst or a polymerization initiator) will be used, with the proviso that the catalyst or catalyst system be substantially water soluble. An illustrative but by no means exhaustive enumeration of such catalysts includes inorganic peroxides such as hydrogen peroxide, sodium perchlorate and sodium perborate, inorganic persulfates such as sodium persulfate, potassium persulfate and ammonium persulfate, and redox systems such as sodium metabisulfite-potassium persulfate, and the like.

In practicing the novel method of the present invention, part of the total amount of monomer employed, i.e., from about 1% to about 25% by weight, and preferably from about 10% to about 15% by weight, based on the total weight of monomer employed, together with part of the total amount of initiator, i.e., from about 0.5 part to about 2.5 parts by weight, and preferably from about 0.75 part to about 1 part by weight, per 100 parts of initially-employed monomer, and part of the total amount of surfactant, i.e., from about 25% to about 90% by weight, and preferably from about 75% to about 85% by weight, based on the total weight of surfactant employed, is polymerized in aqueous medium (which can also contain other materials conventionally employed in emulsion polymerization systems, e.g., a protective colloid, a buffer, such as sodium bicarbonate, in an amount to provide a pH of from about 4.5 to about 5.5, and the like) at reflux temperature until refluxing begins to subside.

At this point, and preferably when refluxing has ceased, the remainder of the required amount of monomer, which can have the same composition as the initially-employed comonomer mixture or a different composition, is added either intermittently or continuously over a period of time ranging from about 2 hours to about 8 hours, and preferably from about 4 hours to about 5 hours.

Simultaneously with this delayed monomer addition, a first delayed catalyst addition is carried out, using from about 0.1 part to about 1 part by weight, and preferably from about 0.25 part to about 0.5 part by weight, per 100 parts of monomer being added. This first delayed catalyst addition will end when from about 40% to about 100%, and preferably from about 70% to about 80%, of the delayed monomer has been introduced. Parenthetically, it should be noted that it is not strictly necessary to continue the first delayed catalyst addition until at least about 40% of the delayed monomer has been introduced. However, if the addition of catalyst is not carried out until at least about this time, lower molecular weight polymers, which may be considered undesirable for certain applications, are generally obtained.

These additions of delayed monomer and first delayed catalyst will usually be carried out at a temperature ranging from about 70° C. to about 90° C.

Whether the delayed addition and polymerization of monomer (which can be either vinyl acetate itself or vinyl acetate admixed with one or more other comonomers) in the manner described herein results in linear polymerization of the added monomer, grafting or block polymerization of said monomer with the already formed emulsion polymer, or a combination of various reactions, the fact remains that the solids content (or more precisely the polymer solids content) of the thus-obtained emulsions will be, in all cases, significantly higher than can be obtained at a given viscosity by conventional emulsion polymerization techniques. At the same time, their viscosities will not be so high as to render them useless for conventional emulsion polymer applications, even at the upper limit of the range of solids contents.

Once all of the first delayed catalyst has been added, the balance of the total amount of surfactant employed (i.e., the amount remaining over and above that added initially) is introduced. This intermediate surfactant can be added all at once or in increments over a period of time ranging from about 1 minute to about 10 minutes. During this addition the temperature will usually be held at from about 70° C. to about 80° C.

At this point, if less than the total amount of monomer required was added prior to the introduction of the first delayed catalyst, the remainder of the required amount can be introduced as a second delayed monomer addition.

Next, subsequent to the addition of the intermediate surfactant solution, and either concurrently with, or immediately following, the addition of the final portion of the monomer phase, a second delayed catalyst addition is begun, using from about 0.1 part to about 0.2 part by weight, and preferably from about 0.15 part to about 0.17 part by weight, based on the total amount of monomer employed, and is continued, at a temperature ranging from about 70° C. to about 90° C., for from about 20 minutes to about 60 minutes, and preferably for from about 30 minutes to about 40 minutes.

Finally, once the last of the second delayed catalyst has been added, the emulsion is held at a temperature of from about 85° C. to about 90° C. for from about 30 to about 60 minutes, then cooled and filtered.

Since the delayed catalysts will preferably be introduced as 1–60% aqueous solutions, in order to maintain a uniform non-volatile content in the emulsion the amount of water necessary to dissolve or disperse the post-added initiator should be deducted from the water which is used initially in preparing the emulsion.

At this point, the viscosity of the thus-prepared emulsion is considerably lower than that of a corresponding emulsion prepared from the same amounts of monomers by conventional methods, as witness the fact that a typical vinyl acetate-ethyl acrylate-di(2-ethylhexyl)maleate terpolymer emulsion, containing 80% by weight of vinyl acetate, based on the total weight of monomers employed, and having a solids content of about 65% (a higher non-volatile content than had hitherto been possible in useful, stable emulsions of this type prepared by conventional methods), which has been prepared in accordance with the novel method of the present invention, has a viscosity of from about 1500 to about 2500 cps. and survives five cycles of alternate freezing and thawing without coagulating. In contrast to this, a polymer emulsion prepared in the conventional manner from the same amounts of the same monomers, and having the same non-volatile content, has a viscosity of from about 7000 to about 10,000 cps. and poor freeze-thaw stability, in that it generally coagulates after one freeze-thaw cycle.

The procedure employed herein to measure freeze-thaw stability is as follows. First, a four-ounce wide-mouth glass jar of approximately 58 mm. inside diameter is filled with a sample of the latex. The Brookfield viscosity at 75°±3° F. is then measured, and a film of the original latex is cast. Next, the jar is closed and placed inside a one-quart can, which is then sealed and placed in a suitable cold box. After the can has been held at 10°±3° F. for 16 hours, it is removed from the cold box and thawed at room temperature for three hours. The jar is then removed from the can and thawed for an additional three hours at room temperature. This treatment constitutes one freeze-thaw cycle.

After each freeze-thaw cycle the thawed latex is stirred in the jar at moderate speed for five minutes to obtain a homogeneous mixture, from which the Brookfield viscosity is measured at 75°±3° F. and a film is cast. The viscosity of the thawed latex and the appearance of the film are then compared with the results obtained using the original latex, and a major deterioration of the film appearance a six-fold increase in viscosity is taken as the point at which a sample is considered to have failed. A sample which passes five freeze-thaw cycles is considered to have satisfactory freeze-thaw stability.

In order that those skilled in the art can more fully understand the present invention, the following examples are set forth. These examples are given solely for the purpose of illustrating the invention, and should not be considered as expressing limitations unless so set forth in the appended claims. All parts and percentages are by weight, unless otherwise stated.

Example I

A surfactant mixture comprising:

| Component: | Parts |
|---|---|
| Tergitol NP-14 (nonylphenylpolyethylene glycol ether; Union Carbide Corp.) | 0.31 |
| Igepal CO-630 [nonylphenoxypoly(ethyleneoxy) ethanol; Antara Chemicals] | 0.63 |
| Igepal CO-897 [nonylphenoxypoly(ethyleneoxy) ethanol homologous to Igepal CO-630; Antara Chemicals] | 3.72 |
| Cellosize WP-09 (hydroxyethyl cellulose; Hercules Powder Company, Inc.) | 0.37 |
| Nopco NDW (defoamer; a blend of mixed hydrocarbons, metallic soaps and 0.5% silicone oil; Nopco Chemical Co., Inc.) | 0.08 |
| Sodium bicarbonate (buffer) | 0.092 | was dispersed in 27.72 parts of deionized water and then charged to polymerization reactor and sparged with nitrogen gas for 30 minutes at a moderate rate.

Next, 7.57 parts of a monomer mixture comprising:

| Component | Parts |
|---|---|
| Vinyl acetate | 47.91 |
| Ethyl acrylate | 8.99 |
| Di(2-ethylhexyl) maleate | 3.00 | was charged to the reactor, with stirring, followed by 0.058 part of dry potassium persulfate. Heat was then slowly applied to the reactor to raise the temperature to 72° C., and heating was continued until all refluxing ceased.

Delayed monomer addition was then begun and programmed to run over a 5 hour period at 72–74° C., during which time the remainder of the monomer mixture was added. Simultaneously, the addition of a first delayed catalyst solution, consisting of 0.037 part of potassium persulfate and 1.74 parts of deionized water, was begun, and was programmed to run over a 4 hour period.

As soon as the last of this catalyst solution had been introduced, a solution of 0.14 part of Igepal CO-630 and 0.75 part of Igepal CO-897 in 1.96 parts of deionized water was added to the reaction mixture. Next, i.e., as soon as this intermediate surfactant solution had been added, the solution of a second delayed catalyst solution, consisting of 0.095 part of potassium persulfate and 0.038 part of sodium bicarbonate in 2.35 parts of deionized water, was begun, and was programmed to run over a 90 minute period.

Sixty minutes after the start of this second delayed catalyst addition (i.e., 5 hours after the delayed monomer addition was begun) the temperature of the reaction mixture was raised to 90° C. and held there for the balance of the time required to complete this addition. The resulting emulsion, after cooling to room temperature and filtration, had the following characteristics:

| | |
|---|---|
| Viscosity (#3 spindle, Brookfield at 25° C.) cps | 1800 |
| Solids percent | 65 |
| Freeze-thaw stability cycles | 5 |
| Unreacted monomer percent | 0.3 |
| pH | 4.7 |

The entire procedure of the foregoing example was repeated four times in every detail but one, namely, potassium persulfate was replaced throughout by equivalent amounts of hydrogen peroxide, sodium perchlorate, sodium persulfate and ammonium persulfate, respectively. In each case, the resulting emulsion had a solids content of approximately 65% and a viscosity of less than 2500 cps., and in addition was stable for 5 cycles when tested for freeze-thaw stability.

Similarly, by again repeating the entire procedure of the foregoing example in every detail but one, namely, replacing only the second delayed potassium persulfate with an equivalent amount of ammonium persulfate, a useful, stable emulsion containing approximately 65% solids and having improved viscosity and freeze-thaw stability was again obtained.

Examples II and III

The entire procedure of Example I was again repeated in every detail in each of these examples except for those changes noted in Table I below. Table II below gives the product characteristics of the thus-obtained emulsions.

TABLE I

| Materials (expressed in parts) | Example II | Example III |
|---|---|---|
| Tergitol NP-14 | 0.47 | 0.31 |
| Igepal CO-630 | 0.85 | 0.77 |
| Igepal CO-897 | 4.68 | 4.47 |
| Cellosize WP-09 | 0.37 | 0.37 |
| Nopco NDW | 0.08 | 0.08 |
| Sodium bicarbonate | 0.13 | 0.13 |
| Vinyl acetate | 47.65 | 47.91 |
| Ethyl acrylate | 8.95 | 8.99 |
| Dioctyl maleate | 2.98 | 3.00 |
| Potassium persulfate | 0.26 | 0.19 |
| Deionized water | 33.59 | 33.77 |
| Processing conditions: | | |
| Initial monomer charge [1] | 30 | 12 |
| Delayed monomer charge [1] | 70 | 88 |
| Initial catalyst [1] | 39.6 | 29.2 |
| First delayed catalyst [1] | 6.9 | 18.9 |
| Second delayed catalyst [1] | 53.5 | 51.9 |
| Initial surfactant [1] | 88.4 | 82.9 |
| Intermediate surfactant [1] | 11.6 | 17.1 |
| Time for monomer addition [2] | 299 | 305 |
| Time for total delayed catalyst [2] | 329 | 335 |
| Reaction temperature [3] | 69–73 | 70–77 |
| Time at reaction temperature [2] | 299 | 305 |
| Finishing temperature [3] | 90 | 90 |
| Time at finishing temperature [2] | 30 | 30 |
| Time elapsed at cool-down [2] | 389 | 395 |

[1] Percent of total.
[2] In minutes.
[3] In ° C.

TABLE II

| Product characteristics | Emulsion of example II | Emulsion of example III |
|---|---|---|
| Brookfield viscosity | 1,000 | 2,125 |
| Solids, percent | 64.9 | 65.1 |
| Freeze-thaw stability, cycles | 5 | 5 |
| Unreacted monomer, percent | 0.31 | 0.28 |
| pH | 4.3 | 4.8 |

Example IV

A surfactant mixture comprising:

| Component: | Parts |
|---|---|
| Tergitol NP-14 | 4.6 |
| Igepal CO-630 | 7.6 |
| Igepal CO-897 | 42.5 |
| Cellosize WP-09 | 4.0 |
| Sodium bicarbonate | 1.2 | was dispersed in 365 parts of deionized water and then charged to a polymerization reactor.

Next, a monomer mixture comprising:

| Component: | Parts |
|---|---|
| Vinyl acetate | 67.4 |
| Ethyl acrylate | 8.0 |
| Dioctyl maleate | 4.0 | was charged to the reactor, with stirring, and the mixture was then sparged with nitrogen gas for 20 minutes at a moderate rate.

0.7 part of dry potassium persulfate was then charged to the reactor, with stirring, and heat was slowly applied to raise the temperature to reflux, with heating then being continued until all refluxing ceased.

A first delayed monomer addition, consisting of:

| Component: | Parts |
|---|---|
| Vinyl acetate | 410.0 |
| Ethyl acrylate | 38.5 |
| Dioctyl maleate | 22.2 | was then begun and programmed to run over a 4 hour period at 72–74° C.

Simultaneously with the addition of this first delayed monomer mixture, a first delayed catalyst solution, consisting of 0.3 part of potassium persulfate in 50 parts of deionized water (a 0.6% solution) was begun, and was programmed to run over the 4 hour period with the monomer.

As soon as the last of the monomer mixture and catalyst solution had been introduced, a solution of 0.7 part of Igepal CO-630 and 4.0 parts of Igepal CO-897 in 10 parts of deionized water was added to the reaction mixture.

Next, i.e., as soon as this intermediate surfactant solution had been added, a second delayed monomer addition, consisting of the remainder of the required amount of monomers, i.e., a mixture of:

| Component: | Parts |
|---|---|
| Vinyl acetate | 70.0 |
| Ethyl acrylate | 18.2 |
| Dioctyl maleate | 6.2 | was introduced over a 60-minute period, with stirring and with the temperature being maintained at 72–74° C.

Immediately upon completion of this second delayed monomer addition, the introduction of a second delayed catalyst solution, consisting of 0.7 part of potassium persulfate and 0.2 part of sodium bicarbonate in 30.0 parts of deionized water, was begun, and was programmed to run over a 60 minute period.

Once the introduction of the second delayed catalyst solution had been completed, the temperature of the reaction mixture was raised to 90° C. and held there for 30 minutes. The resulting emulsion, after cooling to room temperature and filtration, had the following characteristics:

| | |
|---|---|
| Viscosity (#3 spindle, Brookfield, at 25° C.) cps | 1600 |
| Solids percent | 64.2 |
| Freeze-thaw stability cycles | 5 |
| Unreacted monomer percent | 0.30 |
| pH | 4.5 |

Example V

A surfactant mixture comprising:

| Component: | Parts |
|---|---|
| Tergitol NP-14 | 36.8 |
| Igepal CO-630 | 55.0 |
| Igepal CO-897 | 308.0 |
| Cellosize WP-09 | 32.0 |
| Sodium bicarbonate | 8.0 | was dispersed in 2200 parts of deionized water and then charged to a polymerization reactor.

Next, 12% of a monomer mixture comprising:

| Component: | Parts |
|---|---|
| Vinyl acetate | 4379.2 |
| Ethyl acrylate | 517.6 |
| Dioctyl maleate | 259.2 | was charged to the reactor, with stirring, and the mixture was then sparged with nitrogen gas for 30 minutes at a moderate rate.

5.6 parts of dry potassium persulfate were then charged to the reactor, with stirring, and heat was slowly applied to raise the temperature to reflux, with heating then being continued until all refluxing ceased.

A first delayed monomer addition, consisting of 70% of the aforementioned monomer mixture, was then begun and programmed to run over a 4 hour period at 72–74° C. Simultaneously, the addition of a first delayed catalyst solution, consisting of 2.4 parts of potassium persulfate in 400 parts of deionized water (a 0.6% solution), was begun, and was programmed to run over the 4 hour period with the monomer.

As soon as the last of the monomer mixture and catalyst solution had been introduced, a solution of 10 parts of Igepal CO-630 and 60 parts of Igepal CO-897 in 80 parts of deionized water was added to the reaction mixture.

Next, i.e., as soon as this intermediate surfactant solution had been added, a second delayed monomer addition, consisting of the remaining 13% of the aforementioned monomer mixture, was introduced over a 45 minute period, with stirring and with the temperature being maintained at 72–75° C., Thirty minutes after the completion of this second delayed monomer addition (the temperature having been maintained at 72–75° C.), the introduction of a second delayed catalyst solution, consisting of 4.4 parts of potassium persulfate and 3.2 parts of sodium bicarbonate in 240 parts of deionized water, was begun, and was programmed to run over a 60 minute period, with the temperature gradually being raised to 90° C. during this time.

Once the introduction of the second delayed catalyst solution had been completed, the reaction mixture was held at 90° C. for an additional 30 minutes, then cooled to 35° C. and filtered through cheesecloth. The thus-obtained emulsion had the following characteristics:

| | |
|---|---|
| Viscosity (#3 spindle, Brookfield, at 25° C.) cps | 1700 |
| Solids percent | 64.2 |
| Freeze-thaw stability cycles | 5 |
| Unreacted monomer percent | 0.30 |
| pH | 4.6 |

Example VI

A vinyl acrylic interior flat paint containing a polyvinyl acetate emulsion produced in accordance with the present invention can be formalated as follows:

| Component | Pounds | Gallons |
|---|---|---|
| Vinyl acetate copolymer emulsion of Example III (adjusted to 65% solids) | 127.0 | 13.7 |
| Aqueous 2% Methocel (methyl cellulose solution; viscosity, 4,000 cps. at 20° C.; Dow Chemical Co.) | 304.7 | 36.5 |
| Texanol (2,2,4-trimethylpentanediol monoisobutyrate; Eastman Chemical Company) | 4.0 | 0.5 |
| Potassium tripolyphosphate | 2.0 | |
| Titanium dioxide, rutile | 120.0 | 3.4 |
| Atomite (water-ground calcium carbonate; Thompson-Weiman Co.) | 364.7 | 16.2 |
| Water | 150.0 | 17.9 |
| Propylene glycol | 30.0 | 3.5 |
| Phenyl mercuric acetate (bacteriocide) | 0.3 | |
| Water | 93.4 | 11.2 |
| | 1,196.1 | 102.9 |

The resulting paint had a weight/gallon of 11.62 lbs., a solids content of 48.04% a solids volume of 27.21 and a pH of 7.0.

It will be obvious to those skilled in the art that other changes and variations can be made in carrying out the present invention without departing from the spirit and scope thereof as defined in the appended claims.

We claim:

1. A method of preparing a useful, stable aqueous emulsion of a vinyl acetate copolymer from a monomer mixture containing more than about 75% and not more than about 95% by weight, of vinyl acetate alone or together with ethylenically unsaturated monomers other than vinyl acetate whose water solubility is equal to or greater than that of vinyl acetate, the total amount of vinyl acetate in said copolymer being at least about 50% by weight, said percentages being based on the total weight of monomers used, in the presence of surfactant, at least 50% by weight of which is a polyether containing at least four ether linkages, which comprises:

(1) emulsion polymerizing, in aqueous medium at reflux temperature, from about 1% to about 25% by weight, based on the total weight of monomers used, of said monomer mixture in the presence of from about 25% to about 90% by weight of said surfactant and a catalytic amount of a water soluble free radical polymerization catalyst, until refluxing begins to subside, (2) next adding, at a temperature of from about 70° C. to about 90° C., the remainder of said monomer mixture over a period of from about 2 hours to about 8 hours while at the same time adding, over the period of time during which from about 40% total of said remainder of said monomer mixture has been introduced, a first delayed catalytic amount of a water soluble free radical polymerization catalyst, (3) adding, once all of said first delayed catalyst has been introduced, the remainder of said surfactant, (4) adding, subsequent to the addition of said remainder of said surfactant, from about 0.1 part to about 0.2 part by weight, based on the total weight of monomer employed, of a second delayed water soluble free radical polymerization catalyst, and (5) heating the resulting emulsion, once all of said second delayed catalyst has been introduced, at a temperature of from about 85° C. to about 90° C. for from about 30 minutes to about 60 minutes.

2. A process as described in claim 1 wherein from about 10% to about 15% by weight, based on the total weight of monomers used, of said monomer mixture is used initially.

3. A process as described in claim 2 wherein from about 75% to about 85% by weight of said surfactant is used initially.

4. A process as described in claim 2 wherein the addition of said first delayed catalyst is carried out over the period of time during which from about 70% to about 80% of said remainder of said monomer mixture has been introduced.

5. A process as described in claim 1 wherein said second delayed catalyst is added concurrently with the addition of the final portion of said remainder of said monomer mixture.

6. A process as described in claim 1 wherein said second delayed catalyst is added immediately following the addition of the final portion of said remainder of said monomer mixture.

7. A process as described in claim 1 wherein the water soluble free radical polymerization catalyst used throughout is potassium persulfate.

8. A process as described in claim 1 wherein said monomer mixture contains vinyl acetate, ethyl acrylate and di(2-ethylhexyl) maleate.

9. A process as described in claim 1 wherein said monomer mixture contains vinyl acetate, ethyl acrylate and dioctyl maleate.

10. A process as described in claim 1 wherein said polyether is an ethylene oxide condensate.

11. A process as described in claim 1 wherein said polyether is a propylene oxide condensate.

12. A process as described in claim 1 wherein said polyether is an alkylphenoxypoly(ethyleneoxy) ethanol.

13. A process as described in claim 1 wherein said polyether is a nonylphenoxypoly(ethyleneoxy) ethanol.

References Cited

UNITED STATES PATENTS

| 2,508,341 | 5/1950 | Wilson | 260—29.6 |
| 2,892,802 | 6/1959 | Budewitz | 260—29.6 |
| 2,956,973 | 10/1960 | Holdsworth | 260—29.6 |
| 3,275,589 | 9/1966 | Alexander et al. | 260—29.6 |

SAMUEL H. BLECH, *Primary Examiner.*

W. J. BRIGGS, Sr., *Assistant Examiner.*

U.S. Cl. X.R.

260—78.5, 85.7, 89.1